UNITED STATES PATENT OFFICE.

KARL ENGEL, OF HANOVER, GERMANY.

RAW-TALLOW SUBSTITUTE FOR LUBRICATING PURPOSES AND PROCESS FOR MANUFACTURING THE SAME.

1,012,830.

No Drawing.

Specification of Letters Patent. Patented Dec. 26, 1911.

Application filed August 3, 1911. Serial No. 642,111.

*To all whom it may concern:*

Be it known that I, KARL ENGEL, merchant, citizen of Germany, subject of the King of Prussia and Emperor of Germany, residing at Hanover, in the Kingdom of Prussia and Empire of Germany, have invented new and useful Improvements in Raw-Tallow Substitutes for Lubricating Purposes and Processes for Manufacturing the Same, of which the following is a specification.

For lubricating ships' propeller shafts, trunnions in rolling mills and the like it has heretofore been general to employ raw tallow that is to say unrendered tallow or adipose tissue. Raw tallow is specially adapted for this purpose because the animal cellular tissue comprised therein affords a hold for the tallow so that it can be stuffed into the lubricating openings and replenished even during the running which is not possible when melted or rendered tallow which is very brittle, is employed. Raw tallow is, however, very costly and furthermore cannot always be purchased in sufficient quantities. It also deteriorates during storage particularly at high temperatures owing to the decomposition of the animal cellular tissue.

Attempts have already been made to provide a substitute for raw tallow by incorporating threads or filaments of animal, vegetable or mineral origin with a fatty substance. It is not, however, possible in this manner to obtain a real substitute for raw tallow because the disconnected threads and filaments distributed in the fatty mass are unable to impart any intimate cohesion thereto and owing to their small absorbent capacity they are not in a position to hold the fat together when it softens owing to increase of temperature. It is also impossible for those threads and filaments to be consumed in the lubricating process as is the case with the cellular tissue of raw tallow but they remain in the bearings as an unworkable mass so that the bearings become clogged.

Now in accordance with the present invention a substitute for raw tallow is provided by impregnating sponges or sponge waste with a fatty mass which congeals on cooling. By the employment of sponges or sponge waste the structure of which is very similar to cellular tissue all the advantages are attained which in the case of raw tallow are due to this formation without the disadvantages of raw tallow being present. Contrary to what is the case with raw tallow owing to the durability of the spongy substance the mass so obtained is not liable to deteriorate but can be stored for a long time at high temperatures and in the tropics, while it excels in its cheapness especially as instead of tallow any other consistent fat can be incorporated with the sponges. Pieces of any size can be torn off this raw tallow substitute and stuffed into the lubricating holes and this stuffing can be replenished precisely as with raw tallow.

In lubricating shafts and trunnions with this raw tallow substitute the spongy substance is consumed with the fat and therefore presents no impediment to the lubrication but the colloidal property of the spongy substance is rather favorable to the lubricating process. In this connection it is of importance that in the manufacture of the raw tallow substitute the spongy substance is rendered soft or pulpy owing to the fact that the consistent fat must be added to the sponge in the liquid state, that is to say, that the manufacture must be effected by a hot process. This causes the spongy substance to lose its hardness and become a more or less gelatinous mass which especially together with the fat can be readily completely disintegrated and consumed.

In the manufacture of the raw tallow substitute the consistent fat is molten by heating and the sponges or sponge wastes are brought into this molten mass whereby they are impregnated therewith. Upon cooling the fat congeals or becomes solid within the sponge.

Having now described my invention what I claim and desire to secure by Letters Patent of the United States is:

1. A raw tallow substitute for lubricating purposes consisting of a sponge substance impregnated with a consistent fatty mass.

2. A raw tallow substitute for lubricating purposes consisting of sponge waste impregnated with a consistent fatty mass.

3. A process of manufacturing a raw tallow substitute for lubricating, which consists in impregnating a sponge with a hot liquefied fatty mass which congeals on cooling.

4. A process of manufacturing a raw tallow substitute for lubricating, which consists in melting consistent fat, then immersing a spongy substance in said melted fat, and then cooling the fat lubricated sponge.

In testimony whereof I have hereunto set my hand in presence of two subscribing witnesses.

KARL ENGEL.

Witnesses:
ROBERT J. THOMPSON,
MARTA L. THOMPSON.